(12) United States Patent
Li et al.

(10) Patent No.: US 11,789,490 B2
(45) Date of Patent: Oct. 17, 2023

(54) MOUNT FOR A COMPUTER PERIPHERAL DEVICE

(71) Applicant: Logitech Europe S.A., Lausanne (CH)

(72) Inventors: Daphne Li, Newark, CA (US); Drew Putterman, Oakland, CA (US); Chia-Jung Lin, San Jose, CA (US)

(73) Assignee: Logitech Europe S.A., Lausanne (CH)

( * ) Notice: Subject to any disclaimer, the term of this patent is extended or adjusted under 35 U.S.C. 154(b) by 62 days.

(21) Appl. No.: 17/514,837

(22) Filed: Oct. 29, 2021

(65) Prior Publication Data

US 2023/0136884 A1 May 4, 2023

(51) Int. Cl.
| | |
|---|---|
| *G06F 1/16* | (2006.01) |
| *F16M 13/02* | (2006.01) |
| *F16M 11/20* | (2006.01) |
| *F16M 11/10* | (2006.01) |

(52) U.S. Cl.
CPC ........... *G06F 1/1607* (2013.01); *F16M 11/10* (2013.01); *F16M 11/2021* (2013.01); *F16M 13/022* (2013.01)

(58) Field of Classification Search
CPC .. G06F 1/1607; F16M 11/10; F16M 11/2021; F16M 13/022
USPC ..................................................... 248/316.7
See application file for complete search history.

(56) References Cited

U.S. PATENT DOCUMENTS

| | | | | |
|---|---|---|---|---|
| 4,648,698 A | * | 3/1987 | Iwasaki .................. | F16M 13/00 396/419 |
| 5,855,343 A | * | 1/1999 | Krekelberg .......... | F16M 13/022 248/126 |
| 6,663,066 B1 | * | 12/2003 | Hong .................. | H04M 15/745 396/421 |
| 7,219,866 B2 | * | 5/2007 | Depay .................. | F16M 13/022 248/231.41 |
| 7,431,253 B2 | * | 10/2008 | Yeh ........................ | F16M 13/00 248/231.51 |
| 7,572,073 B2 | * | 8/2009 | Kenoyer .............. | F16M 13/022 396/428 |
| 7,618,202 B2 | * | 11/2009 | Xiao ..................... | G06F 1/1607 396/428 |
| 7,931,243 B2 | * | 4/2011 | Yim ....................... | H04R 1/026 248/231.51 |
| 9,169,962 B2 | * | 10/2015 | Wang ..................... | F16M 11/14 |

(Continued)

*Primary Examiner* — Muhammad Ijaz
(74) *Attorney, Agent, or Firm* — KILPATRICK TOWNSEND & STOCKTON LLP

(57) ABSTRACT

A camera mounting system comprises a clip body configured to be coupled to a rear surface of the display monitor. The camera mounting system further comprises a bracket assembly that includes a first portion configured to be coupled to the camera and comprising a base and a lip extending from the base. The base is configured to be supported on a top surface of the display monitor and the lip is configured to contact a front surface of the display monitor and limit movement of the bracket assembly in a first horizontal direction perpendicular to the front surface of the display monitor. The bracket assembly also includes second portion coupled to the first portion and configured to be releasably coupled to the clip body with the clip body coupled to the rear surface of the monitor in order to prevent movement of the bracket assembly in the first horizontal direction and prevent rotation of the base relative to the display monitor.

19 Claims, 8 Drawing Sheets

(56) References Cited

U.S. PATENT DOCUMENTS 10,980,304 B2* 4/2021 Volmer .................... F21L 4/04
2023/0136884 A1* 5/2023 Li .......................... F16M 13/00
                                                    248/316.7

* cited by examiner

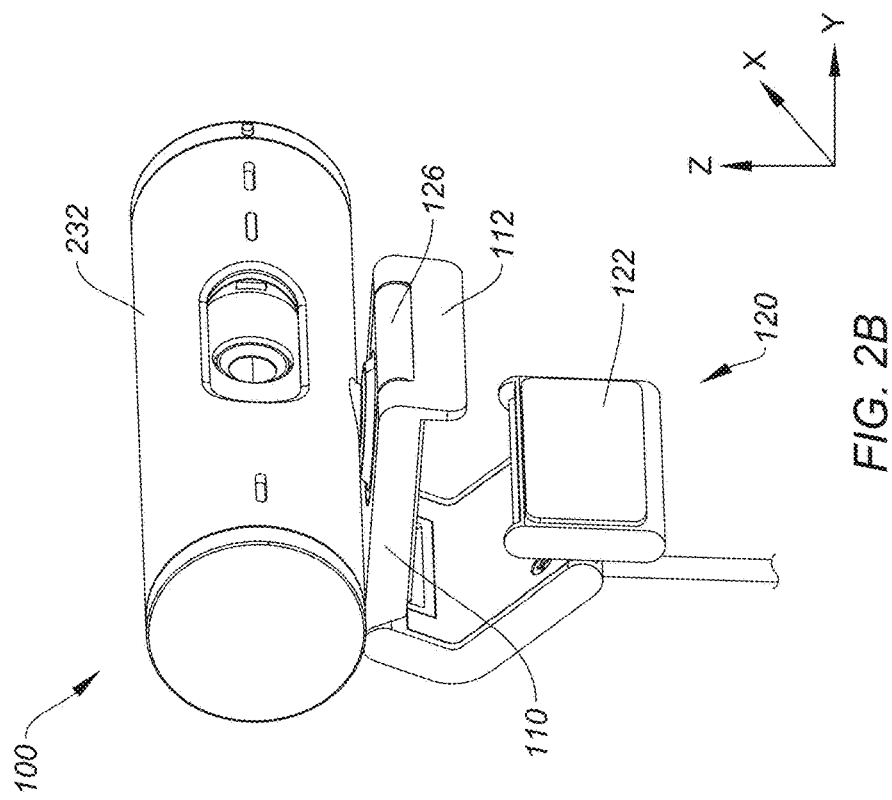
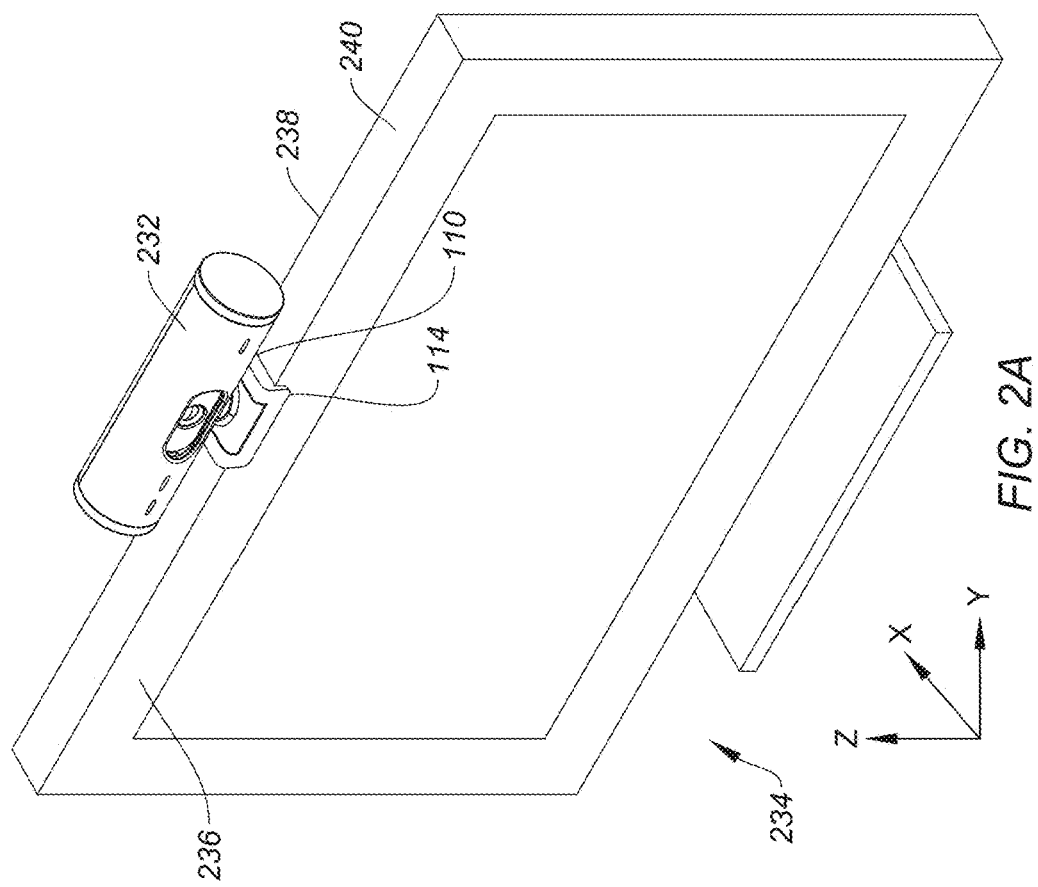

MOUNT FOR A COMPUTER PERIPHERAL DEVICE

BACKGROUND

Computer peripheral devices, such as cameras, can be positioned with respect to another device, such as a display monitor, using a mount. A user may position the mount on the display monitor so that the user is in view of the camera while the user views the display monitor. However, articulation of the camera while positioned on the display monitor may cause the mount to become unstable or fall off of the display monitor. Improvements in mounts are needed to provide more secure attachment of the mounts to display monitors.

BRIEF SUMMARY

In certain embodiments, a camera mounting system, for mounting a camera to a display monitor includes a clip body that can be coupled to a rear surface of the display monitor and a bracket assembly. The bracket assembly includes a first portion that can be coupled to the camera. The first portion includes a base and a lip extending from the base. The base can be supported on a top surface of the display monitor and the lip is can contact a front surface of the display monitor and limit movement of the bracket assembly in a first horizontal direction perpendicular to the front surface of the display monitor. A second portion is coupled to the first portion and can be releasably coupled to the clip body with the clip body coupled to the rear surface of the monitor in order to prevent movement of the bracket assembly in the first horizontal direction and prevent rotation of the base relative to the display monitor. The camera mounting system can also include the camera coupled to the first portion of the bracket assembly. With the second portion coupled to the clip body and with the clip body coupled to the rear surface of the monitor, a center of gravity of the assembly of the camera coupled to the bracket assembly is positionable in front of a forward edge of the top surface of the display monitor while the first portion is supported on the top surface of the display monitor without causing the bracket assembly to rotate forward. The first portion includes a hinge coupled to the base that can allow the camera to be rotated relative to the display monitor with the base supported on the top surface of the display monitor. The hinge and the coupling of the second portion to the clip body can allow rotation of the camera from a first position to a second position, relative to the display monitor, by a user manipulating the camera, without the user manipulating the bracket assembly, and without causing the base to rotate relative to the display monitor. In the first position the camera can be aimed at a user in front of the display monitor, and in the second position the camera can be aimed a document on a surface below the display monitor. In the first position the center of gravity of the assembly of the camera coupled to the bracket assembly is positioned over the top surface of the display monitor, and in the second position the center of gravity of the assembly of the camera coupled to the bracket assembly is positioned in front of the top surface of the display monitor. The assembly of the camera coupled to the bracket assembly can be mounted to a second display monitor with the first portion supported on a top surface of the second display monitor, the second portion contacting a rear surface of the second display monitor, and the second portion not coupled to a clip body. The clip body includes an adhesive surface, and the clip body can be coupled in a releasable manner via the adhesive surface adhering to the rear surface of the display monitor. The clip body defines tracks configured to receive edges of a portion of the second portion in order to slidably releaseably couple the second portion to the clip body in order to prevent movement of the bracket assembly in the first horizontal direction and prevent rotation of the base relative to the display monitor.

In certain embodiments, a camera mounting system, for mounting a camera to a display monitor includes a bracket assembly. The bracket assembly includes a first portion that can be coupled to the camera. The first portion includes a base and a lip extending from the base. The base can be supported on a top surface of the display monitor and the lip is can contact a front surface of the display monitor and limit movement of the bracket assembly in a first horizontal direction perpendicular to the front surface of the display monitor. A second portion is coupled to the first portion and can be releasably coupled to a clip body with the clip body coupled to a rear surface of the display monitor in order to prevent movement of the bracket assembly in the first horizontal direction and prevent rotation of the base relative to the display monitor. The camera mounting system can also include the camera coupled to the first portion of the bracket assembly. With the second portion coupled to the clip body and with the clip body coupled to the rear surface of the monitor, a center of gravity of the assembly of the camera coupled to the bracket assembly is positionable in front of a forward edge of the top surface of the display monitor while the first portion is supported on the top surface of the display monitor without causing the bracket assembly to rotate forward. The first portion includes a hinge coupled to the base that can allow the camera to be rotated relative to the display monitor with the base supported on the top surface of the display monitor. The hinge and the coupling of the second portion to the clip body can allow rotation of the camera from a first position to a second position, relative to the display monitor, by a user manipulating the camera, without the user manipulating the bracket assembly, and without causing the base to rotate relative to the display monitor. In the first position the camera can be aimed at a user in front of the display monitor, and in the second position the camera can be aimed a document on a surface below the display monitor. In the first position the center of gravity of the assembly of the camera coupled to the bracket assembly is positioned over the top surface of the display monitor, and in the second position the center of gravity of the assembly of the camera coupled to the bracket assembly is positioned in front of the top surface of the display monitor. The assembly of the camera coupled to the bracket assembly can be mounted to a second display monitor with the first portion supported on a top surface of the second display monitor, the second portion contacting a rear surface of the second display monitor, and the second portion not coupled to a clip body. The clip body includes an adhesive surface, and the clip body can be coupled in a releasable manner via the adhesive surface adhering to the rear surface of the display monitor.

In certain embodiments, a bracket assembly for mounting a first device onto a second device includes a top bracket portion comprising a main body portion defining a front edge, a rear edge, and a bottom surface extending between the front edge and the rear edge. The top bracket portion can further comprise a front tab extending from the front edge of the main body portion. The front tab can define a first rearward facing surface forming a first angle with the bottom surface. The top bracket portion can be configured to couple to the first device. The bracket assembly can further comprise an upper rear arm portion coupled to the rear edge of the of the main body portion and a lower rear arm portion coupled to the upper rear arm portion so that the upper rear arm portion is positioned between the main body portion and the lower rear arm portion. The bracket assembly can also include a clip body coupled to the lower rear arm portion and defining a second rearward facing surface facing the lower rear arm portion and a forward facing surface opposite the second rearward facing surface. The second device can include a housing defining a housing front surface, a housing rear surface facing opposite the housing front surface, and a housing top surface extending between the housing front surface and the housing rear surface. The bracket assembly can be configured to be supported by and coupled to the second device with the bottom surface contacting the housing top surface, the first rearward facing surface contacting the housing front surface, and the forward facing surface of the clip body coupled to and contacting the housing rear surface.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIGS. 2A-2C show perspective views of an example of a camera mounted to a display monitor with a bracket assembly with an optical axis of the camera substantially perpendicular to a display surface of a display monitor, according to certain embodiments;

DETAILED DESCRIPTION

Figure 1A:
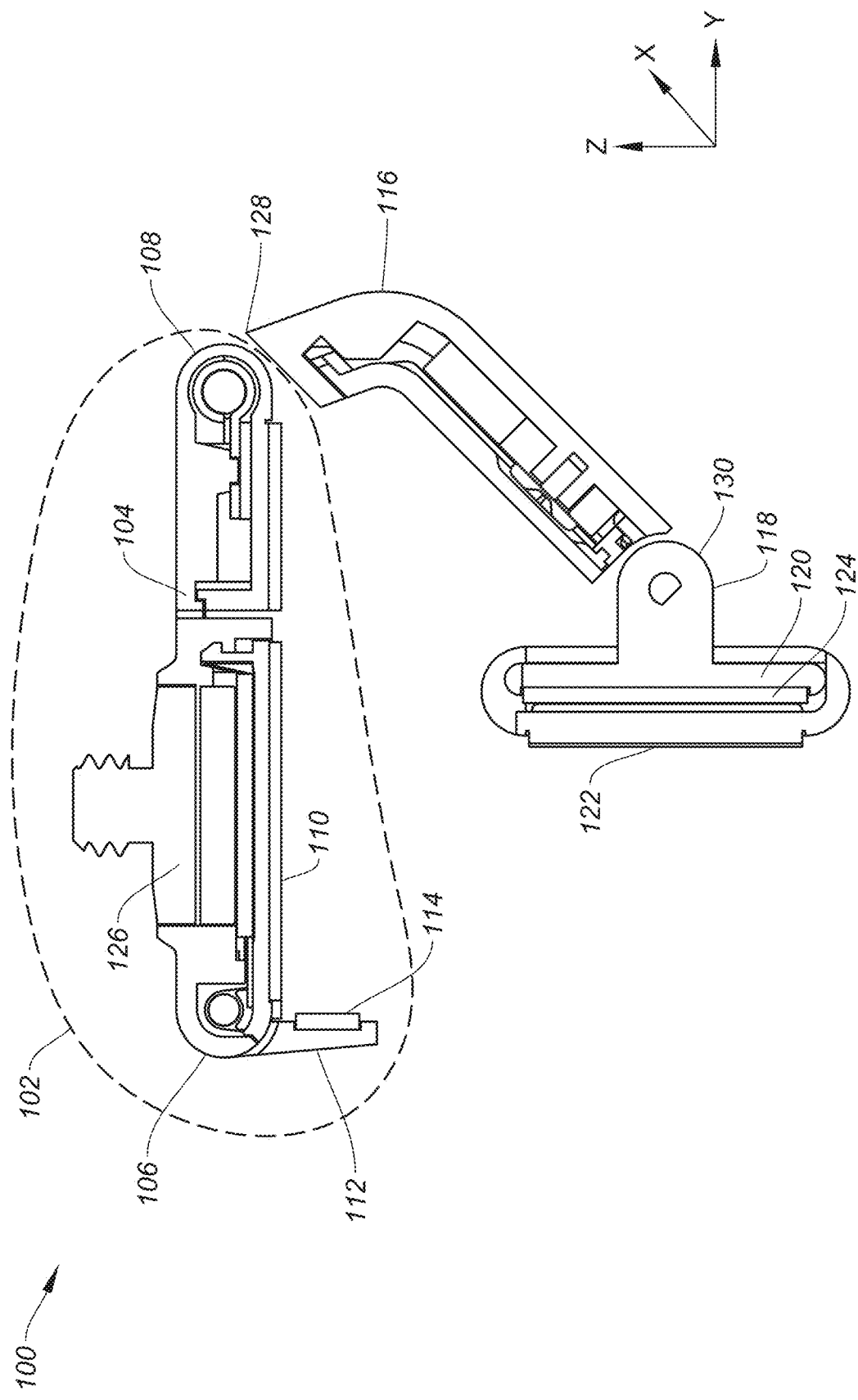
FIG. 1A shows a cross-sectional view of an example of a bracket assembly for mounting a first device to a second device, according to certain embodiments.

Aspects of the present disclosure relate generally to computer peripheral devices, and more particularly to a mount for mounting a camera to a display monitor, according to certain embodiments.

In the following description, various examples of the mount are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Many of the embodiments relate to novel mounts for webcams. The mount, which may be referred to as a bracket assembly, can include a first portion with a lip that can contact a front surface of a display monitor and a bottom surface that can contact a top surface of the display monitor. The bracket assembly can also include a second portion that can couple to a clip body, which can couple to a rear surface of the display monitor. With the second portion coupled to the clip body, the mount may be securely attached to the display monitor and may allow the webcam to be rotated to a desired position with respect to the display monitor. The mount may also be securely attached to the display monitor without the clip body, with the second portion contacting the rear surface of the display monitor, but the clip body can provide additional prevention of rotation and translation of the mount when coupled to the display monitor.

In some embodiments, the concepts described above can be implemented, for instance, by a bracket assembly comprising a first portion that includes a base and a lip. The base can be a top bracket portion that includes a main body portion. The main body portion defines a front edge, a rear edge, and a bottom surface extending between the front edge and the rear edge. The top bracket portion can also include a front tab, which can be the lip, extending from the front edge of the main body portion. The front tab can define a first rearward facing surface forming an angle with the bottom surface. The top bracket portion can couple to the first device, which may be a camera. The bracket assembly can also include a second portion that includes an upper rear arm portion coupled to the rear edge of the of the main body portion and a lower rear arm portion coupled to the upper rear arm portion so that the upper rear arm portion is positioned between the main body portion and the lower rear arm portion. A clip body of the bracket assembly can be releasably coupled to the lower rear arm portion and can define a second rearward facing surface facing the lower rear arm portion and a forward facing surface opposite the second rearward facing surface. The second device, which may be a display monitor, can include a housing defining a housing front surface, a housing rear surface facing opposite the housing front surface, and a housing top surface extending between the housing front surface and the housing rear surface. The bracket assembly can be supported by and coupled to the second device with the bottom surface contacting the housing top surface, the first rearward facing surface contacting the housing front surface, and the forward facing surface of the clip body coupled to and contacting the housing rear surface.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

Embodiments of a Package for a Computer Peripheral Device

Figure 1B:
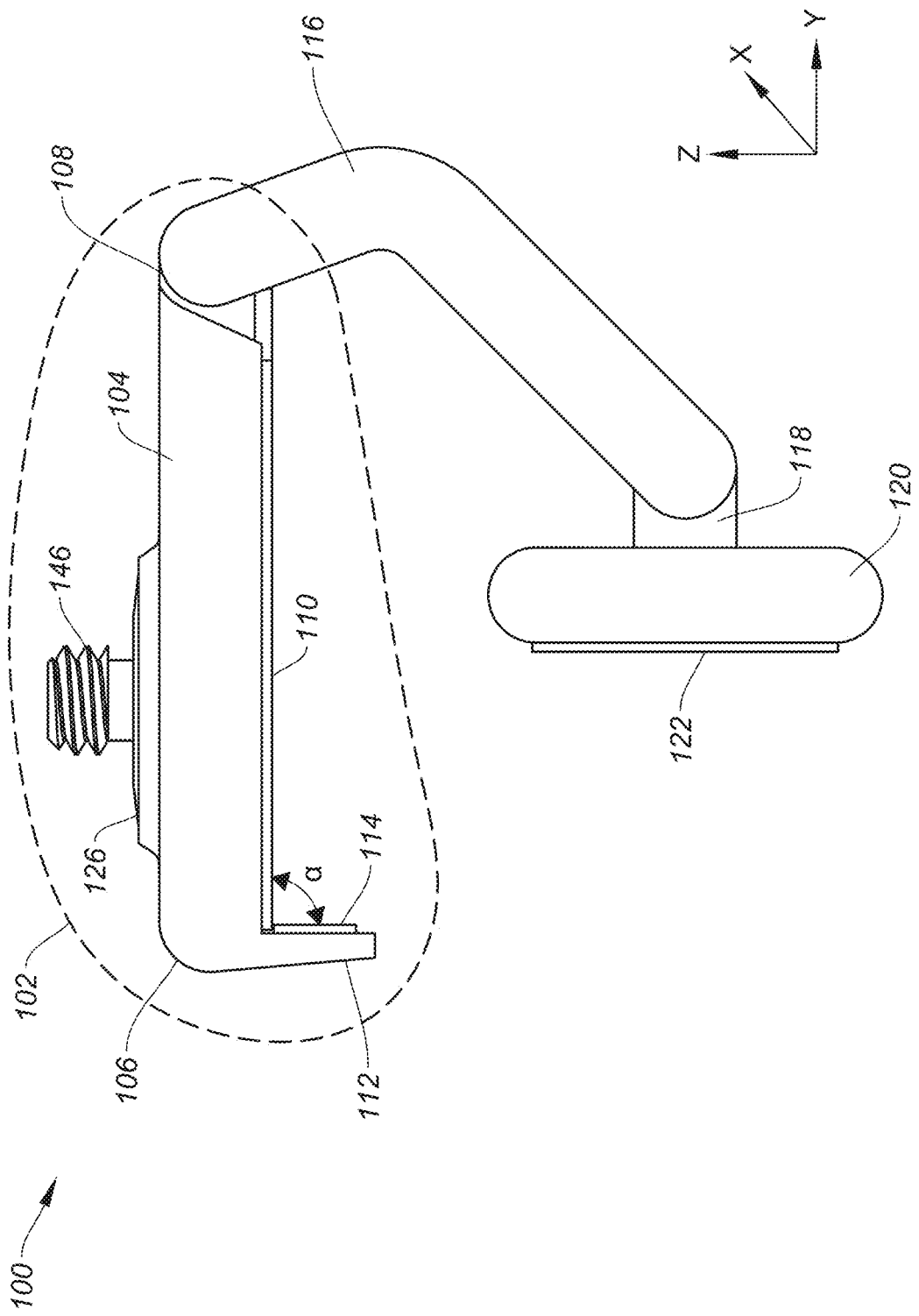
FIG. 1B shows a side view of an example of a bracket assembly for mounting a first device to a second device, according to certain embodiments.

FIG. 1A shows a cross-sectional view of an example of a bracket assembly 100 for mounting a first device to a second device, according to certain embodiments. FIG. 1B shows a perspective view of the bracket assembly 100. As an example, the bracket assembly 100 can couple a camera (first device) to a display monitor (second device). The bracket assembly 100 can include a first portion and a second portion. The first portion is a top bracket portion 102 and the second portion includes an upper rear arm portion 116 and a lower rear arm portion 118. The top bracket portion 102 is coupled to the upper rear arm portion 116 that is coupled to the lower rear arm portion 118, which is coupled to a clip body 120.

According to an XYZ coordinate system, the top bracket portion 102 can be orientated in an XY plane, with a bottom surface 110 of the top bracket portion 102 facing in a negative Z direction, i.e. downward, which can correspond to gravity. The top bracket portion 102 can include a base, such as main body portion 104 that defines a front edge 106, a rear edge 108, and the bottom surface 110. Between the front edge 106 and the rear edge 108, the main body portion 104 can be substantially rectangular. A length of the main body portion 104 in the Y direction can be longer than a depth of the display monitor between a display surface of the display monitor and a rear surface of the display monitor. For example, the main body portion 104 may be between 0.25 inches and 7 inches long. A width of the main body portion 104 in the X direction may be less than the length. The top bracket portion 102 can also include a lip, such as front tab 112, extending from the front edge 106 of the main body portion 104. The front tab 112 can be rectangular and extend in the negative Z direction from the front edge 106. A width of the front tab 112 can be the same as the width of the main body portion 104, but a length of the front tab 112 may be short, such as less than one inch in the Z direction. The front tab 112 can define a first rearward facing surface 114 that can form an angle with the bottom surface 110. The first rearward facing surface 114 can face in a positive Y direction toward a display surface of the display monitor. The angle is illustrated as a, and is shown to be 90°, but the angle may be larger or smaller in other examples. The top bracket portion 102 can also include a mounting arm 126 that is pivotably coupled to the front edge 106 of the main body portion 104. The mounting arm 126 can include a mounting mechanism, such as threads 146 or a magnet, for coupling to the camera.

In an example, the upper rear arm portion 116 is coupled to the rear edge 108 of the main body portion 104. The upper rear arm portion 116 can be pivotably coupled to the main body portion 104 with a first hinge 128. The first hinge 128 can allow the main body portion 104 to pivot in the Z direction with respect to the upper rear arm portion 116. The upper rear arm portion 116 can have a bend from a positive Y direction to a negative Y direction along the negative Z direction. The upper rear arm portion 116 can be substantially rectangular with a same length in the X direction as the main body portion 104. A length of the upper rear arm portion 116 in the Z direction can be less than a height of the display monitor, but a shorter length may be more advantageous for a better center of gravity of the bracket assembly 100 with a camera coupled to the bracket assembly 100. With a better center of gravity, a user may more easily be able to adjust the camera without the bracket assembly 100 becoming unstable or falling from the display monitor.

The lower rear arm portion 118 is coupled to the upper rear arm portion 116 so that the upper rear arm portion 116 is positioned between the main body portion 104 and the lower rear arm portion 118. The upper rear arm portion 116 can be pivotably coupled to the lower rear arm portion 118 with a second hinge 130. The lower rear arm portion 118 can also be rectangular, with a same width in the X direction as the upper rear arm portion 116. The second hinge 130 can allow the lower rear arm portion 118 to pivot in the Z direction with respect to the upper rear arm portion 116. The lower rear arm portion 118 can contact a housing rear surface of the display monitor to secure the bracket assembly 100 to the display monitor.

The lower rear arm portion 118 can be coupled to and uncoupled from the clip body 120. The clip body 120 can define a second rearward facing surface 124 facing the lower rear arm portion 118 (e.g., facing the positive Y direction). The clip body 120 can also define a forward facing surface 122 that is opposite the second rearward facing surface 124. That is, the forward facing surface 122 can face a negative Y direction. A distance in the Y direction between the first rearward facing surface 114 and the forward facing surface 122 can be adjustable to the depth of the display monitor. For example, the distance may be adjustable between 0.25 inches and 3 inches. The clip body 120 may be a sleeve that defines tracks (shown as tracks 448 in FIG. 4C) in which the lower rear arm portion 118 can be positioned within. The lower rear arm portion 118 may slidably couple and snap into the clip body 120. Left and right surfaces of the lower rear arm portion 118 can slide along the Z direction and snap into the tracks to couple the lower rear arm portion 118 to the clip body 120. A forward facing surface of the lower rear arm portion 118 can contact the second rearward facing surface 124 of the clip body 120 when the lower rear arm portion 118 is coupled to the clip body 120. This coupling can limit relative rotational and translational movement of the lower rear arm portion 118 relative to the clip body 120 except for translation in the Z direction. In other examples, the clip body 120 may be a magnet that can magnetically couple to another magnet on the lower rear arm portion 118, Velcro that can couple to other Velcro on the lower rear arm portion 118, or a different adhesive mechanism for coupling the clip body 120 to the lower rear arm portion 118.

Figure 2C:
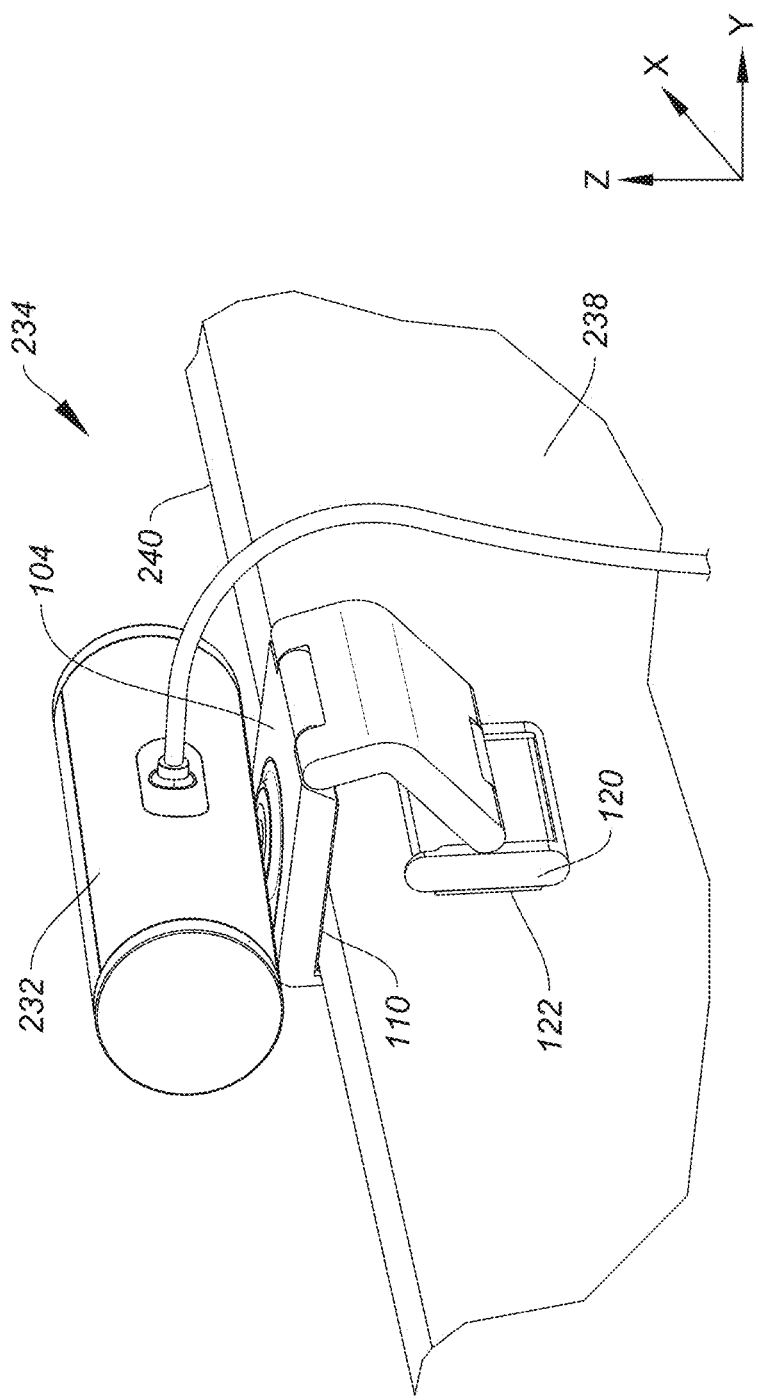

FIGS. 2A-2C show perspective views of an example of a camera 232 oriented in a first position with respect to a display surface 242 of a display monitor 234, according to certain embodiments. The display monitor 234 may include a housing around the display screen and housing display electronics. The housing may define a housing front surface 236, a housing rear surface 238, and a housing top surface 240. The housing front surface 236 may be parallel to the display surface 242 of the display screen and is opposite the housing rear surface 238. The housing top surface 240 can extend between the housing front surface 236 and the housing rear surface 238. The camera 232 can be coupled to a bracket assembly 100 at a mounting arm 126 of the bracket assembly 100. The bracket assembly 100 can be coupled to and supported by the display monitor 234 by the housing top surface 240 contacting a bottom surface 110 of the bracket assembly 100, the housing front surface 236 contacting a first rearward facing surface 114 of a front tab 112 of the bracket assembly 100, and the housing rear surface 238 coupled to and contacting a forward facing surface 122 of a clip body 120. The front tab 112 can limit movement of the bracket assembly 100 in a first horizontal direction perpendicular to the housing front surface 236. For example, the first rearward facing surface 114 of the front tab 112 can contact the housing front surface 236 in order to limit movement of the bracket assembly 100 in the Y direction.

The first position can correspond to a position in which an optical axis of the camera 232 is substantially perpendicular to the display surface 242 of the display monitor 234 in order to capture the subject in front of the display monitor, e.g. a user. In the first position, the center of gravity of the assembly of the camera 232 coupled to the bracket assembly 100 is positioned over the housing top surface 240 of the display monitor 234.

Figure 3B:
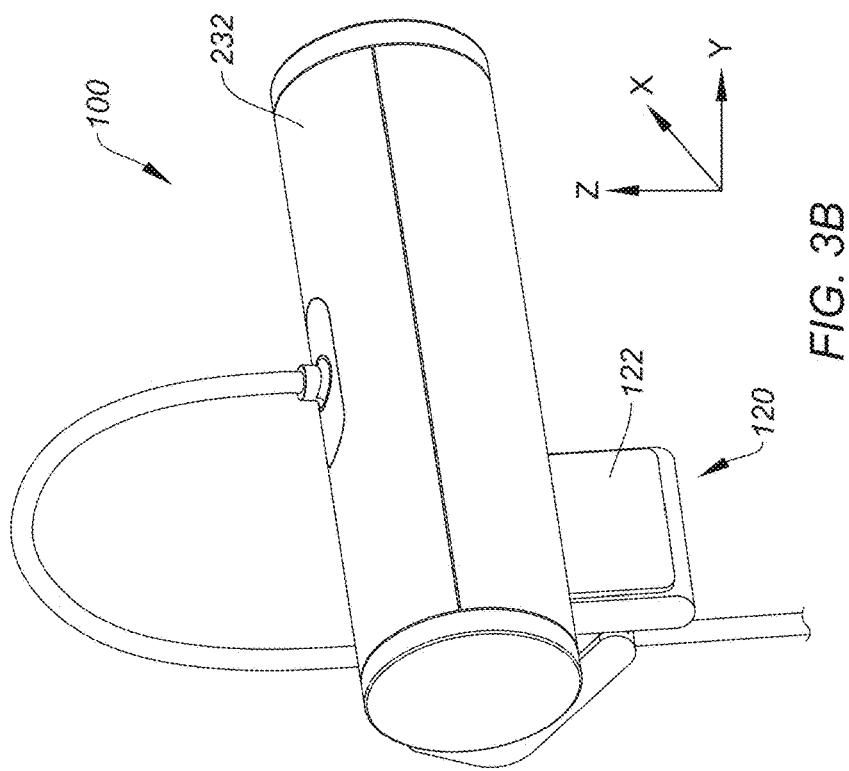
FIGS. 3A-3C show perspective views of an example of a camera mounted to a display monitor with a bracket assembly with an optical axis of the camera substantially parallel to a display surface of a display monitor, according to certain embodiments.
Figure 3A:
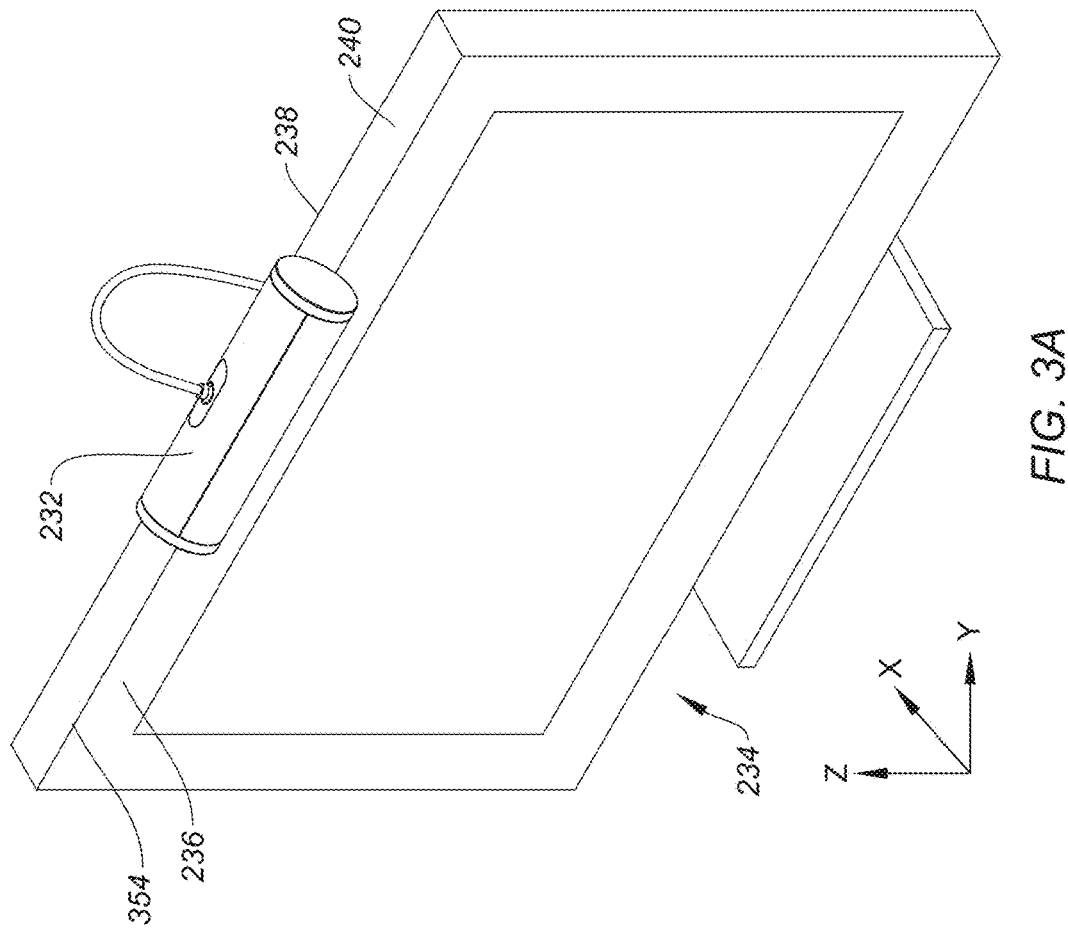
Figure 3C:
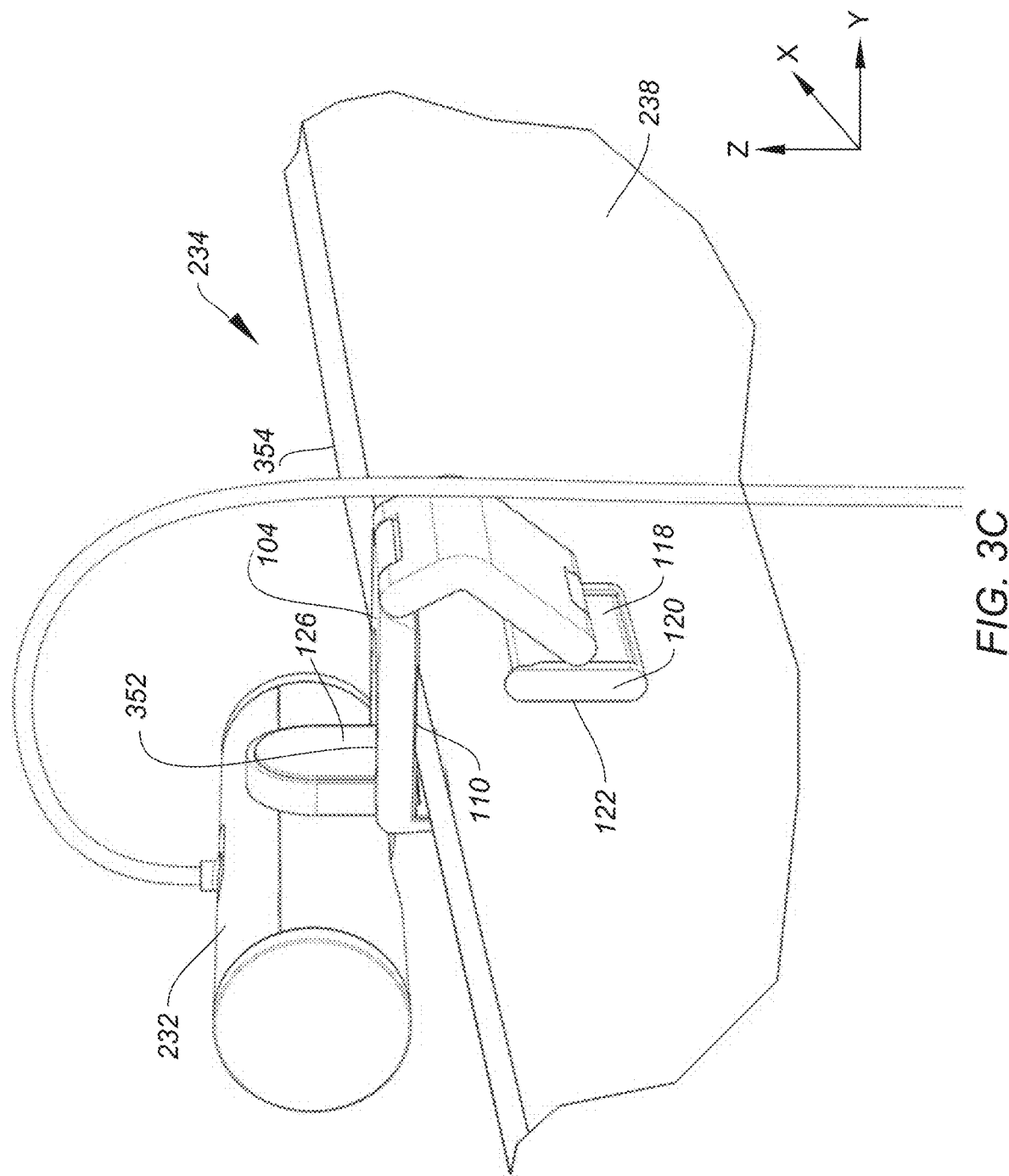

FIGS. 3A-3C show perspective views of an example of a camera 232 oriented in a second position with respect to a display surface 242 of a display monitor 234, according to certain embodiments. The mounting arm (e.g., mounting arm 126 in FIGS. 1, 2A, and 2B) can include a hinge 352 allowing the mounting arm 126 to pivot relative to the main body portion 104 allowing the optical axis of the camera 232 to be rotated from being substantially perpendicular to the display surface 242 to being substantially parallel to the display surface 242. With the optical axis substantially parallel to the display surface 242, an object, such as a document, on a surface that the display monitor 234 is positioned on, e.g. a desk surface, can be captured by the camera and presented on the display surface 242 and to other users of a videoconference. To transition the camera 232 from the first positon to the second position a user may grasp the camera 232 and pull the camera 232 in the negative Y-direction in order to cause the mounting arm 126 to rotate via the hinge 352 coupling the mounting arm 126 to the main body portion 104 around the X-axis. In the second position, the center of gravity of the camera 232 and the bracket assembly 100 can be positioned in front of a forward edge 354 of the housing top surface 240 of the display monitor 234. With the clip body 120 coupled to the lower rear arm portion 118, due to the coupling of the forward facing surface 122 of the clip body 120 to the housing rear surface 238 and the coupling of the clip body 120 to the lower rear arm portion 118, rotation of a main body portion 104 of the bracket assembly 100 relative to the display monitor 234 due to the forwardly positioned center of gravity is prevented while the mounting arm is pivoted relative to the main body portion 104. That is, the bottom surface 110 remains in contact with the housing top surface 240 while the mounting arm 126 is pivoted without the need of a user holding the main body portion 104 in place, thus allowing one-handed repositioning of the camera 232 between the first position and the second position. The clip body 120 thus negates a need for a weight, e.g. a metal bar, to be included internally within the upper rear arm portion (e.g., upper rear arm portion 116 in FIGS. 1A-1B) or the lower rear arm portion 118 to counter balance the mass of the camera 232. In some embodiments, a weight may be included in order to have the center of mass positioned more in the Y-direction, for additional support.

Figure 4B:
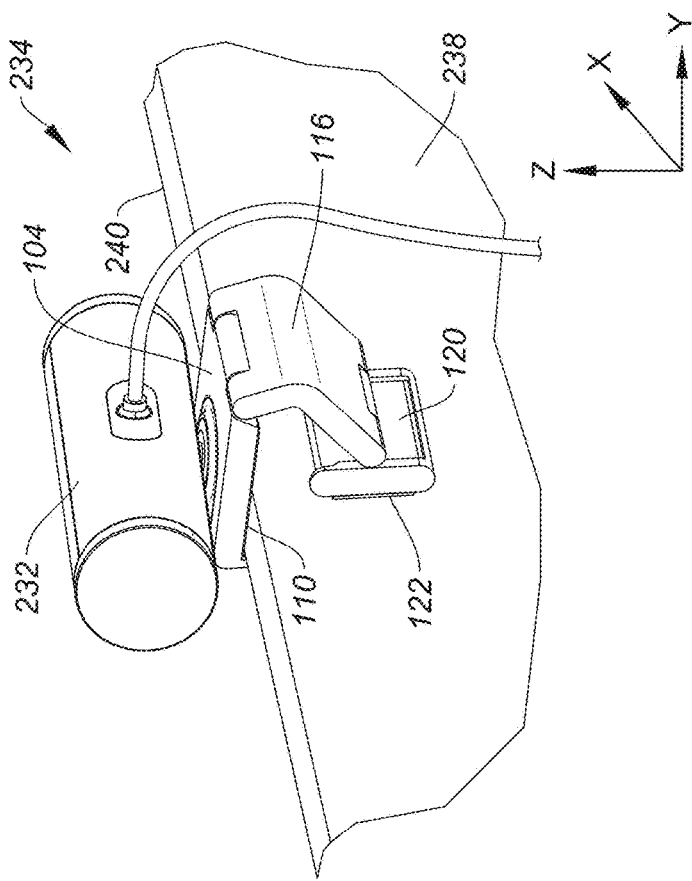
FIGS. 4A-4C show perspective views of stages of mounting and unmounting a bracket assembly, coupled to a camera, to and from a display monitor, according to certain embodiments.
Figure 4A:
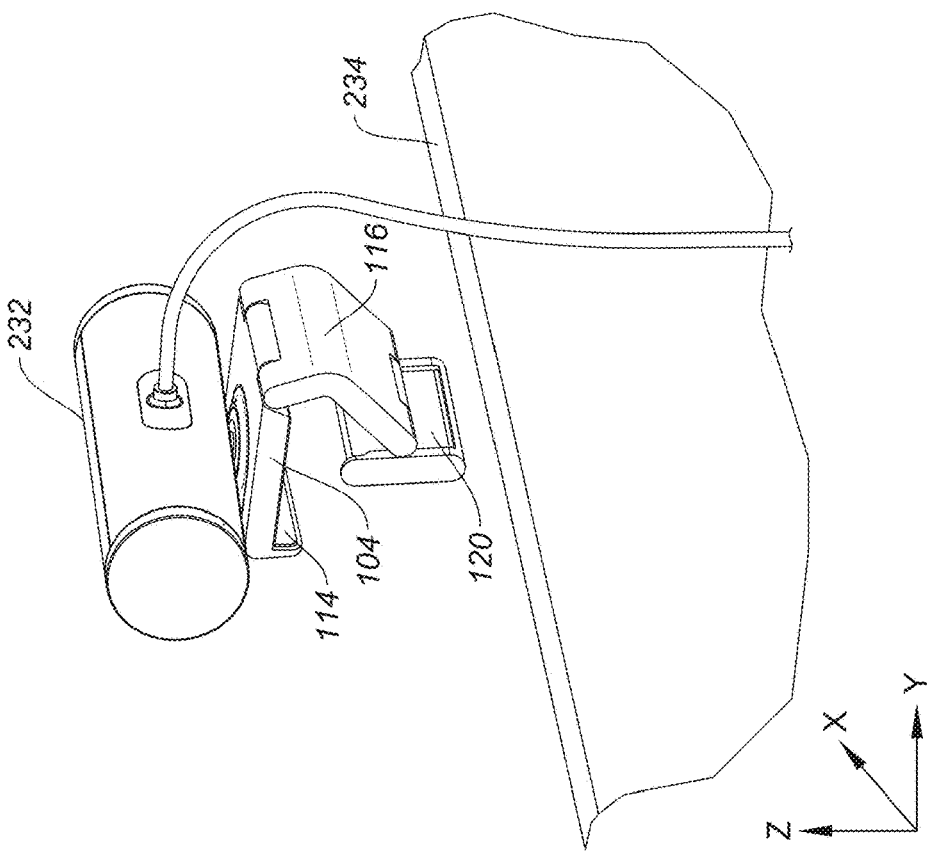
Figure 4C:
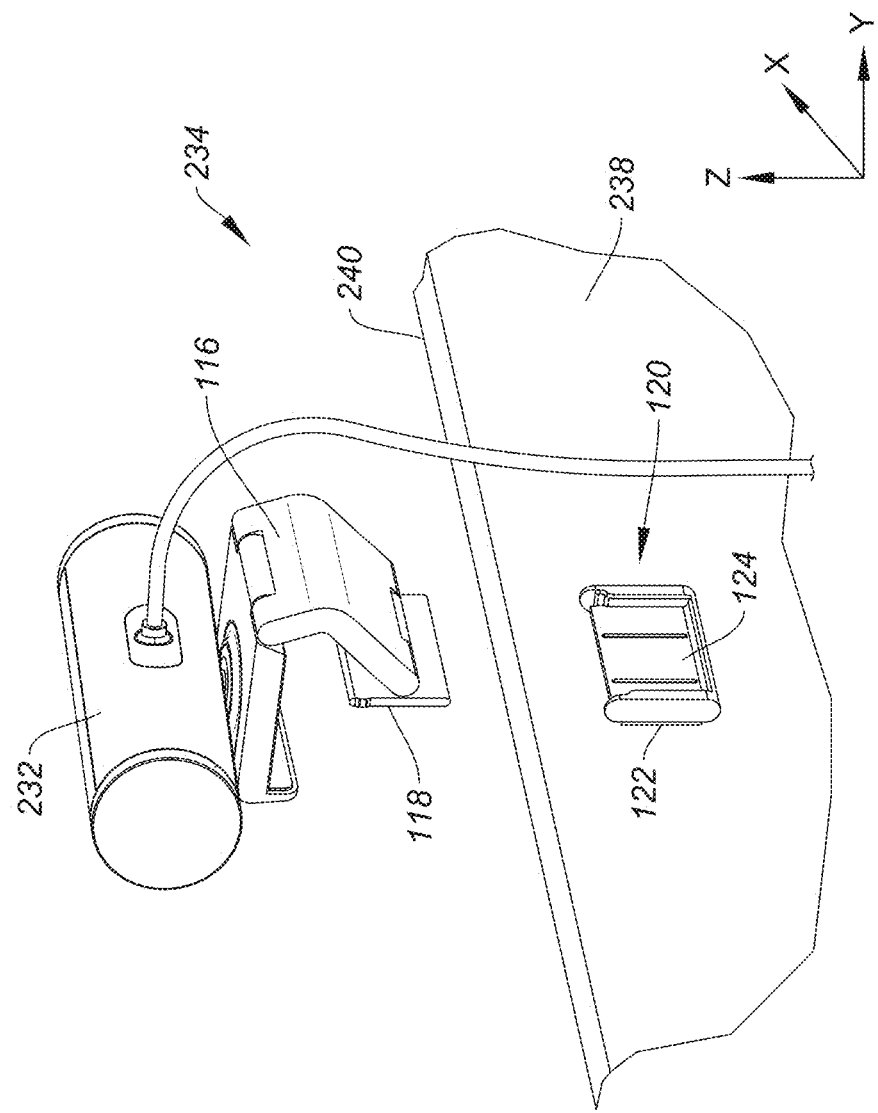

FIGS. 4A-4C show perspective views of steps for mounting and unmounting an assembly of a camera and bracket assembly to and from a display monitor, according to certain embodiments. In FIG. 4A, an initial configuration of a bracket assembly 100 prior to mounting on a display monitor 234 is shown. A camera 232 is coupled to the bracket assembly 100. The bracket assembly 100 includes a clip body 120 coupled to a lower rear arm portion 118 of the bracket assembly 100.

In FIG. 4B, the bracket assembly 100 is mounted to the display monitor 234. A forward facing surface 122 of the clip body 120 can be an adhesive surface, such as micro-suction tape, to couple to a housing rear surface 238 of the display monitor 234 in a releasable manner. Other portions of the bracket assembly 100, such as a bottom surface 110, and a first rearward facing surface 114 may be in contact with the display monitor 234, wherein only the forward facing surface 122 of the clip body 120 may be coupled to the display monitor 234. The first rearward facing surface 114 can prevent translation of the bracket assembly 100 in the Y direction. The coupling of the lower rear arm portion 118 to the clip body 120 can restrict all relative rotational and translational movement of the lower rear arm portion 118 relative to the clip body 120 except for translation in a coupling/uncoupling direction. For example, the coupling/uncoupling direction may be in a Z direction, as shown in FIG. 4C, so the lower rear arm portion 118 may only be able to move in the Z direction relative to the clip body 120.

In FIG. 4C, the bracket assembly 100 is partially unmounted from the display monitor 234, with the clip body 120 uncoupled from the lower rear arm portion 118 and adhesively coupled to the housing rear surface 238. The clip body 120 can define two tracks 448 into which edges of the lower rear arm portion 118 can be positioned to couple the lower rear arm portion 118 to the clip body 120. Additionally, the tracks 448 and the lower rear arm portion 118 can define complimentary detents in the lower rear arm portion 118 to slidably couple and snap in a coupled position relative to the clip body 120. The clip body 120 can also include path features 144 to further assist with coupling the lower rear arm portion 118 to the clip body 120. The path features 144 can be extrusions that corresponding indentations of the lower rear arm portion 118 can receive to align the lower rear arm portion 118 appropriately with the clip body 120. In addition, a bottom lip 450 of the clip body 120 can prevent the lower rear arm portion 118 from sliding downwardly out of the clip body 120. When the lower rear arm portion 118 is coupled to the clip body 120, a bottom surface of the lower rear arm portion 118 can contact the bottom lip feature 450. The lower rear arm portion 118 can be repeatedly coupled and uncoupled from the clip body 120 using the tracks 448, the path features 144, and the complimentary detents. As such, a user can determine a desired position for the bracket assembly 100 with the camera 232 mounted and position and coupled the clip body 120 on the housing rear surface 238 such that the bracket assembly 100 remains at the desired position. Each time the clip body 120 is coupled to the lower rear arm portion 118, the bracket assembly 100 and the camera 232 will be positioned at the preconfigured desired position.

In some examples, a mounting system may include a plurality of clip bodies. The plurality of clip bodies may be coupled to multiple second devices, for example multiple display monitors or other computer peripheral devices, and/or in multiple positions on the same second device. The plurality of clip bodies allows a user to preconfigure a plurality of desired positions to be used with a single assembly of a camera and a bracket assembly, wherein the user may uncouple the bracket assembly from a first clip body at a first preconfigured desired position and then coupled the bracket assembly to a second clip body at a second preconfigured desired position. This allows the user to quickly mount a camera without taking time to re-determine the position and aiming at the new placement. For example, the first preconfigured desired position may be on a desktop display monitor and be used for single person web conferences and the second preconfigured desired position may be on a wall mounted display monitor in a conference room and be used for multi person web conferences. This allows camera use to occur in multiple locations without having dedicated cameras in each location.

The assembly of the bracket assembly 100 coupled to the camera 232 may be mounted to another display monitor, or at a different position of the display monitor 234, without the clip body 120. The bottom surface 110 of the main body portion 104 can be supported on a top surface of the other display monitor. The lower rear arm portion 118 can contact a rear surface of the other display monitor without being coupled to the clip body 120. As a result, the bracket assembly 100 can be securely coupled to the other display monitor without the clip body 120, but using the clip body 120 can provide additional support while the camera 232 is transitioned between the first position and the second position, as described in FIGS. 2A-C and 3A-C.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, or other action "based on" one or more recited conditions or values may, in practice, be based on additional conditions or values beyond those recited.

What is claimed is:

1. A camera mounting system, for mounting a camera to a display monitor, the system comprising:
    a clip body, wherein the clip body is configured to be coupled to a rear surface of the display monitor; and
    a bracket assembly, wherein the bracket assembly comprises:
    a first portion configured to be coupled to the camera and comprising a base and a lip extending from the base, wherein the base is configured to be supported on a top surface of the display monitor and the lip is configured to contact a front surface of the display monitor and limit movement of the bracket assembly in a first horizontal direction perpendicular to the front surface of the display monitor, and
    a second portion coupled to the first portion and configured to be releasably coupled to the clip body with the clip body coupled to the rear surface of the monitor,
    wherein the clip body defines tracks configured to receive edges of a portion of the second portion in order to slidably releaseably couple the second portion to the clip body.

2. The camera mounting system of claim 1, the second portion is configured to be releasably coupled to the clip body with the clip body coupled to the rear surface of the monitor in order to prevent movement of the bracket assembly in the first horizontal direction and prevent rotation of the base relative to the display monitor.

3. The camera mounting system of claim 1, further comprising the camera, wherein the camera is coupled to the first portion of the bracket assembly.

4. The camera mounting system of claim 3, wherein with the second portion coupled to the clip body with the clip body coupled to the rear surface of the monitor, a center of gravity of the camera coupled to the bracket assembly is positionable in front of a forward edge of the top surface of the display monitor while the first portion is supported on the top surface of the display monitor without causing the bracket assembly to rotate forward.

5. The camera mounting system of claim 4, wherein the assembly of the camera coupled to the bracket assembly is configured to be mounted to a second display monitor with the first portion supported on a top surface of the second display monitor, the second portion contacting a rear surface of the second display monitor, and the second portion not coupled to the clip body.

6. The camera mounting system of claim 4, wherein the first portion comprises a hinge coupled to the base, wherein the hinge is configured to allow the camera to be rotated relative to the display monitor with the base supported on the top surface of the display monitor.

7. The camera mounting system of claim 6, wherein the hinge and the coupling of the second portion to the clip body are configured to allow rotation of the camera from a first position to a second position, relative to the display monitor, by a user manipulating the camera, without the user manipulating the bracket assembly, and without causing the base to rotate relative to the display monitor.

8. The camera mounting system of claim 7, wherein in the first position the camera is configured to be aimed at a user in front of the display monitor, and in the second position the camera is configured to be aimed a document on a surface below the display monitor.

9. The camera mounting system of claim 8, wherein in the first position the center of gravity of the assembly of the camera coupled to the bracket assembly is positioned over the top surface of the display monitor, and in the second position the center of gravity of the assembly of the camera coupled to the bracket assembly is positioned in front of the top surface of the display monitor.

10. The camera mounting system of claim 1, wherein the clip body comprises an adhesive surface, and wherein the clip body is configured to be coupled in a releasable manner via the adhesive surface adhering to the rear surface of the display monitor.

11. A camera mounting system, for mounting a camera to a display monitor, the system comprising:
a bracket assembly, wherein the bracket assembly comprises:
a first portion configured to be coupled to the camera and comprising a base and a lip extending from the base, wherein the base is configured to be supported on a top surface of the display monitor and the lip is configured to contact a front surface of the display monitor and limit movement of the bracket assembly in a first horizontal direction perpendicular to the front surface of the display monitor, and
a second portion coupled to the first portion and configured to be releasably coupled to a clip body with the clip body coupled to a rear surface of the monitor in order to prevent movement of the bracket assembly in the first horizontal direction and prevent rotation of the base relative to the display monitor,
wherein an assembly of the camera coupled to the bracket assembly is configured to be mounted to a second display monitor with the first portion supported on a top surface of the second display monitor, the second portion contacting a rear surface of the second display monitor, and the second portion not coupled to the clip body.

12. The camera mounting system of claim 11, further comprising the camera, wherein the camera is coupled to the first portion of the bracket assembly.

13. The camera mounting system of claim 12, wherein with the second portion coupled to the clip body with the clip body coupled to the rear surface of the monitor, a center of gravity of the camera coupled to the bracket assembly is positionable in front of a forward edge of the top surface of the display monitor while the first portion is supported on the top surface of the display monitor without causing the bracket assembly to rotate forward.

14. The camera mounting system of claim 13, wherein the first portion comprises a hinge coupled to the base, wherein the hinge is configured to allow the camera to be rotated relative to the display monitor with the base supported on the top surface of the display monitor.

15. The camera mounting system of claim 14, wherein the hinge and the coupling of the second portion to the clip body are configured to allow rotation of the camera from a first position to a second position, relative to the display monitor, by a user manipulating the camera, without the user manipulating the bracket assembly, and without causing the base to rotate relative to the display monitor.

16. The camera mounting system of claim 15, wherein in the first position the camera is configured to be aimed at a user in front of the display monitor, and in the second position the camera is configured to be aimed a document on a surface below the display monitor.

17. The camera mounting system of claim 16, wherein in the first position the center of gravity of the assembly of the camera coupled to the bracket assembly is positioned over the top surface of the display monitor, and in the second position the center of gravity of the assembly of the camera coupled to the bracket assembly is positioned in front of the top surface of the display monitor.

18. The camera mounting system of claim 11, wherein the clip body comprises an adhesive surface, and wherein the clip body is configured to be coupled in a releasable manner via the adhesive surface adhering to the rear surface of the display monitor.

19. A bracket assembly for mounting a first device onto a second device, comprising:
a top bracket portion comprising a main body portion defining a front edge, a rear edge, and a bottom surface extending between the front edge and the rear edge, wherein the top bracket portion further comprises a front tab extending from the front edge of the main body portion, wherein the front tab defines a first rearward facing surface forming a first angle with the bottom surface, and wherein the top bracket portion is configured to couple to the first device;
an upper rear arm portion coupled to the rear edge of the of the main body portion;
a lower rear arm portion coupled to the upper rear arm portion so that the upper rear arm portion is positioned between the main body portion and the lower rear arm portion; and
a clip body coupled to the lower rear arm portion and defining a second rearward facing surface facing the lower rear arm portion and a forward facing surface opposite the second rearward facing surface;
wherein the second device comprises a housing defining a housing front surface, a housing rear surface facing opposite the housing front surface, and a housing top surface extending between the housing front surface and the housing rear surface,
wherein the bracket assembly is configured to be supported by and coupled to the second device with the bottom surface contacting the housing top surface, the first rearward facing surface contacting the housing front surface, and the forward facing surface of the clip body coupled to and contacting the housing rear surface.

* * * * *